US 6,617,841 B2

(12) United States Patent
Thao

(10) Patent No.: US 6,617,841 B2
(45) Date of Patent: Sep. 9, 2003

(54) METHOD AND APPARATUS FOR CHARACTERIZATION OF ELECTRONIC CIRCUITRY

(75) Inventor: Hemavann Thao, Royal Oaks, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/741,123

(22) Filed: Dec. 19, 2000

(65) Prior Publication Data

US 2002/0074992 A1 Jun. 20, 2002

(51) Int. Cl.[7] .............................................. G01R 1/00
(52) U.S. Cl. ................ 324/158.1; 324/713; 324/765; 324/754
(58) Field of Search .......................... 714/724, 719; 91/682; 324/543, 754, 158.1, 765, 713, 534, 724

(56) References Cited

U.S. PATENT DOCUMENTS 5,570,012 A * 10/1996 Orense ................... 324/158.1
6,016,058 A * 1/2000 Sussman et al. ........... 324/543
6,087,842 A * 7/2000 Parker et al. .............. 324/763
6,262,580 B1 * 7/2001 Wu ........................... 324/713

* cited by examiner

*Primary Examiner*—Kamand Cuneo
*Assistant Examiner*—Jimmy Nguyen
(74) *Attorney, Agent, or Firm*—O'Melveny & Myers LLP

(57) ABSTRACT

The present invention is a method and apparatus for characterization of electronic circuitry. Electronic systems rely on correct circuitry to function properly. Thus, a testing process is utilized to ensure correctness of circuitry. Some testing methods require multiple steps to test connectivity and correctness of circuitry. These methods are inefficient in some applications. The present invention improves efficiency of the testing process of some electronic systems. One embodiment of the present invention injects a known current into a circuit at a test point by providing a known voltage across a known resistance. The voltage at the test point is measured and the circuit is characterized by a plot of the known voltage minus the measured voltage with respect to the measured voltage. One embodiment is used to improve efficiency in testing advanced functional testers. Since a circuit is characterized by the embodiment contacting one test point, continuity and integrity from each connector pin are tested simultaneously. Thus, the need for a shorting board test is eliminated. Other embodiments are used to test other electrical systems.

20 Claims, 9 Drawing Sheets

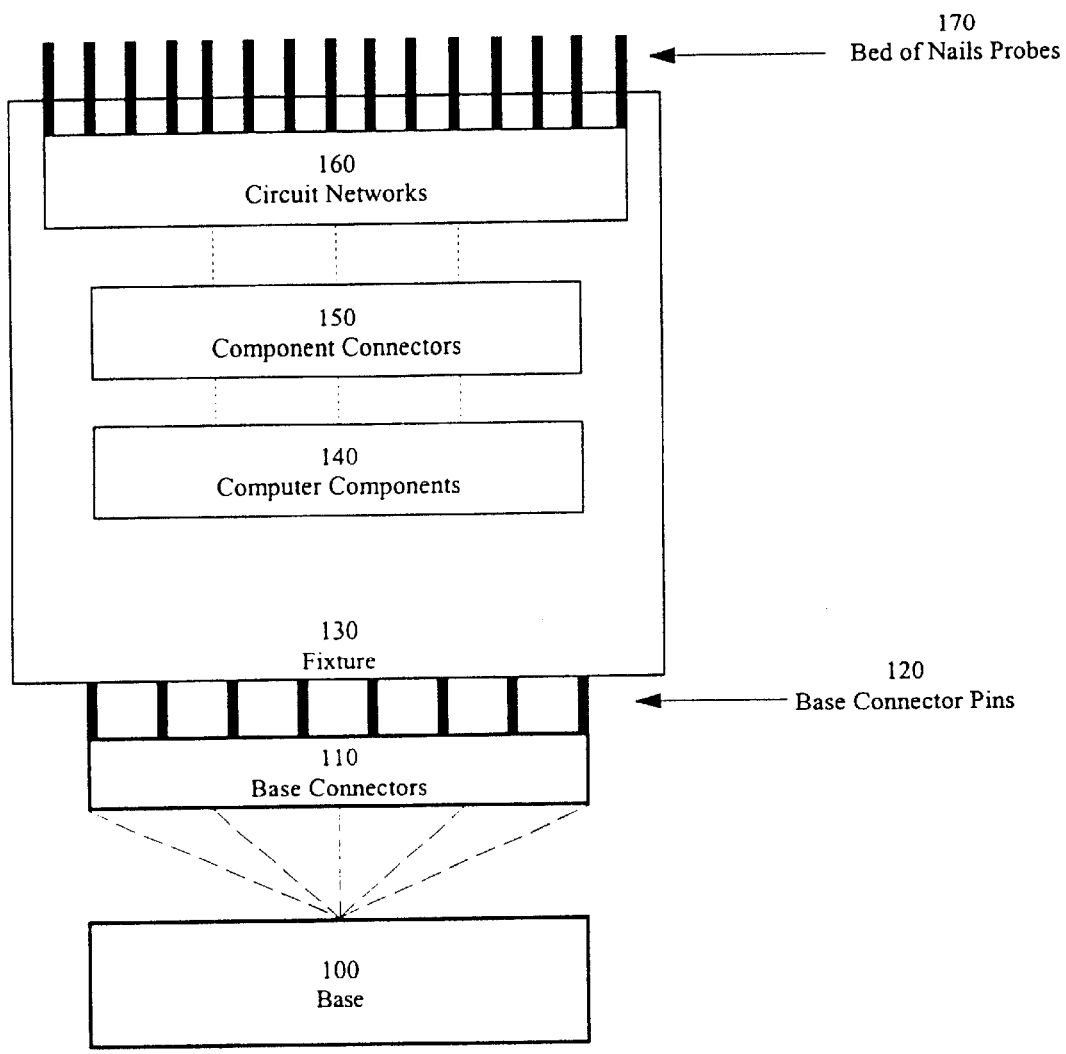
Figure 1: One Embodiment of an AFT
PRIOR ART

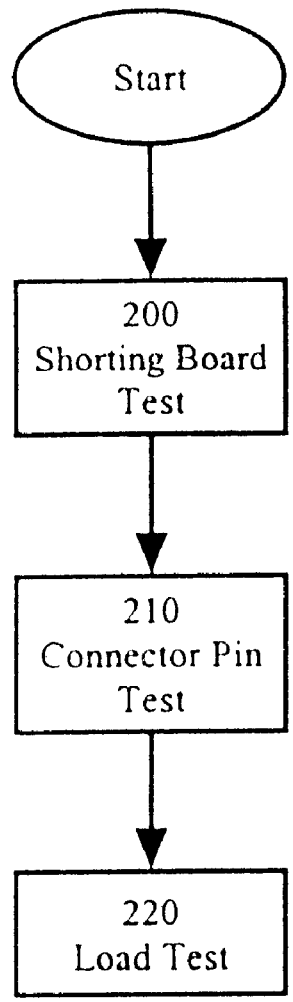
Figure 2: AFT Testing Process (Prior Art)
PRIOR ART

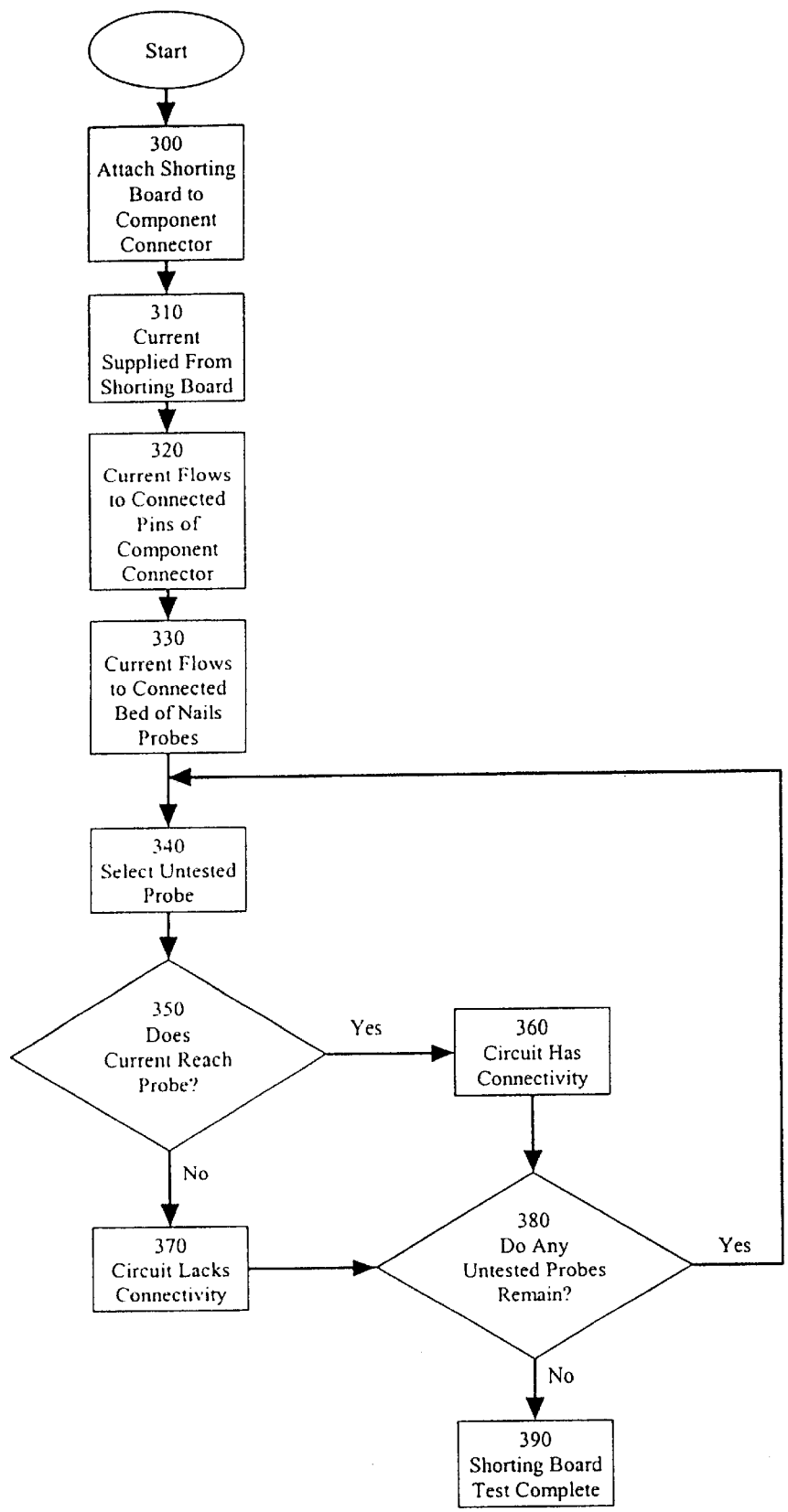
Figure 3: Shorting Board Test
PRIOR ART

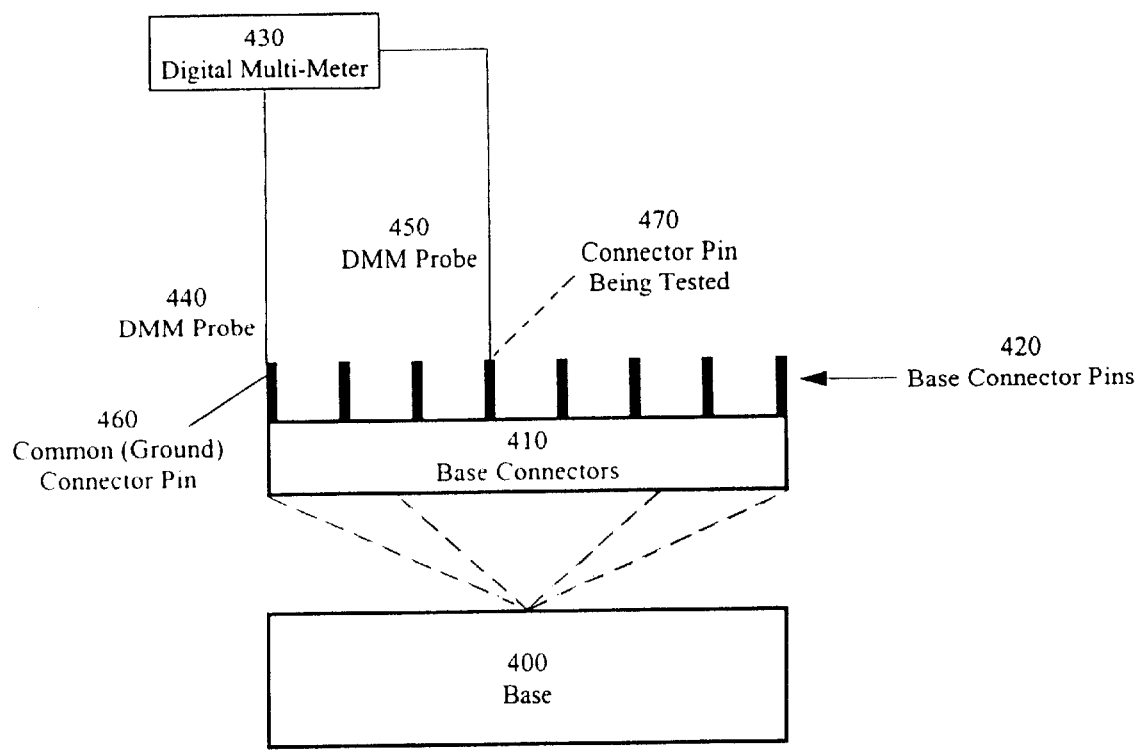
Figure 4: One Embodiment of Connector Pin Test
PRIOR ART

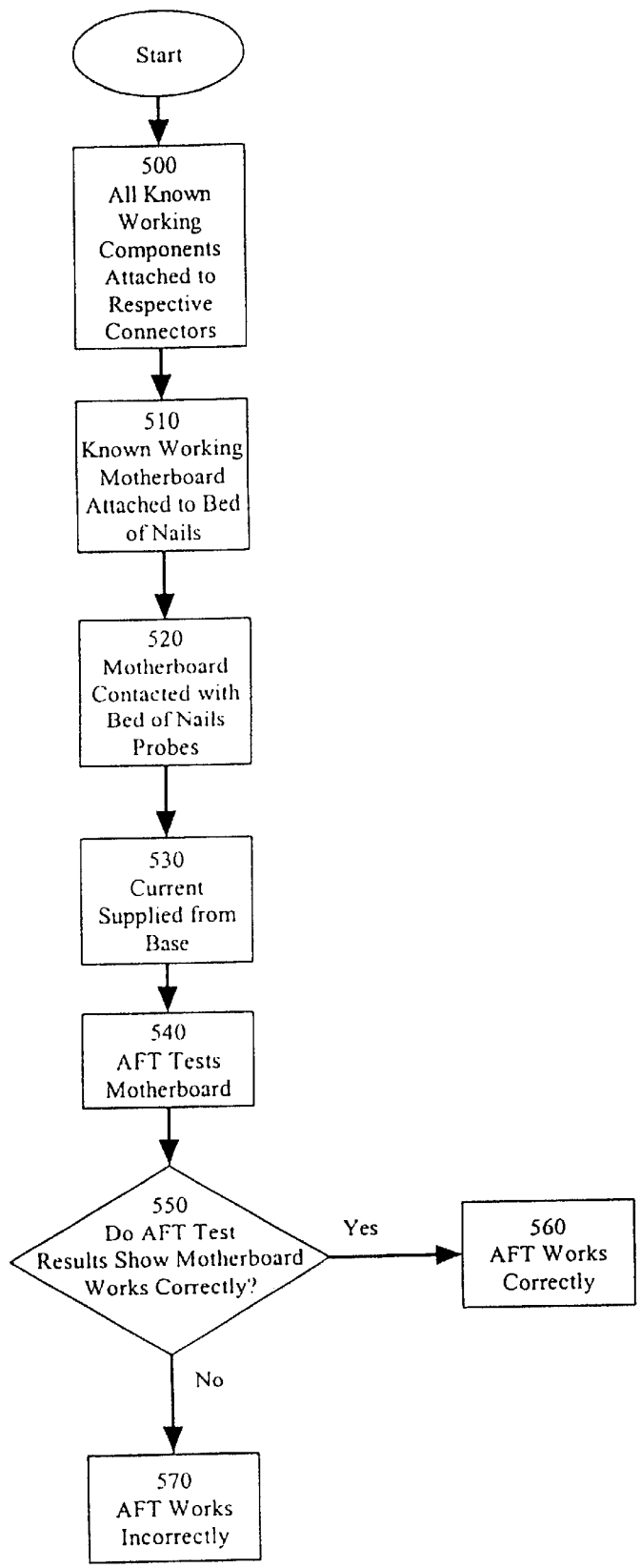
Figure 5: Load Testing Process
PRIOR ART

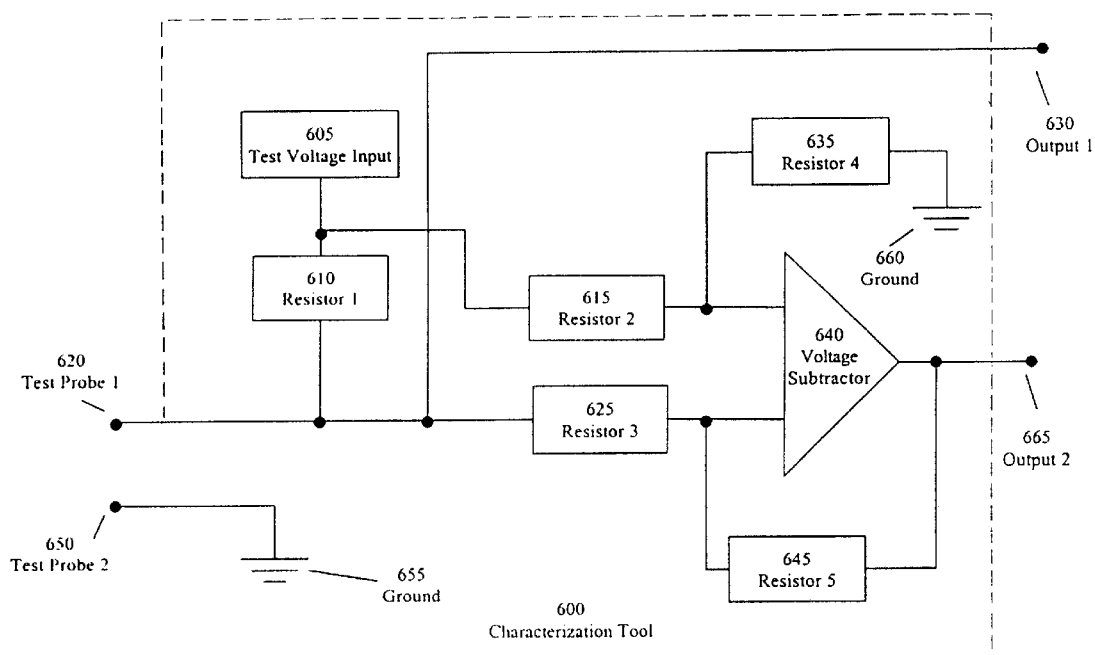
Figure 6: Characterization Tool

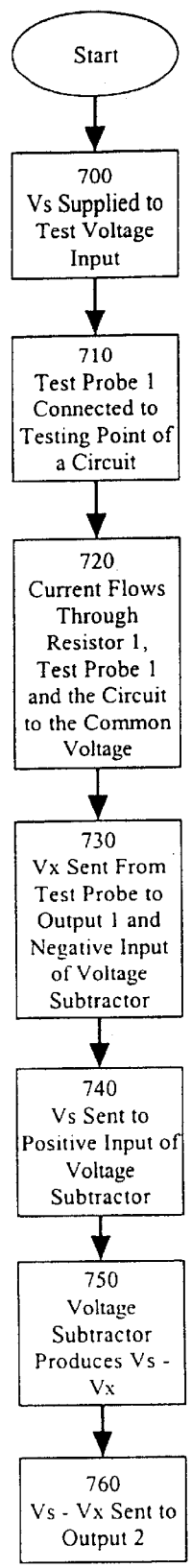
Figure 7: Operation of Characterization Tool

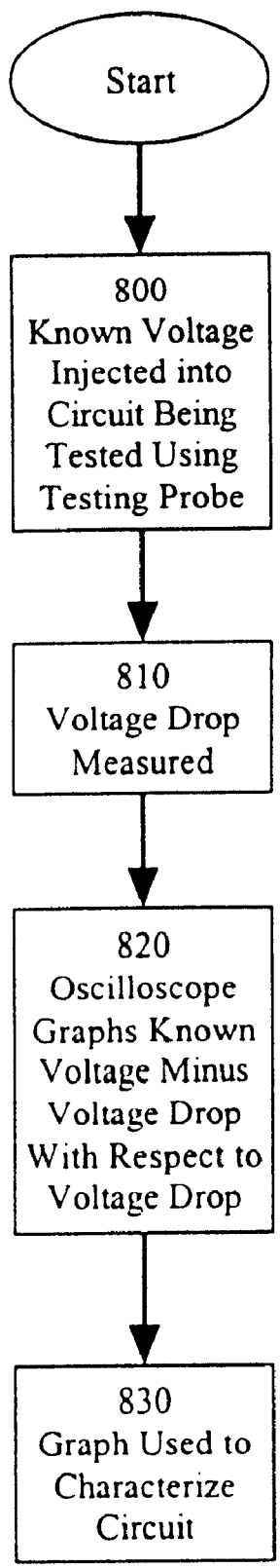
Figure 8: Characterizing a Circuit

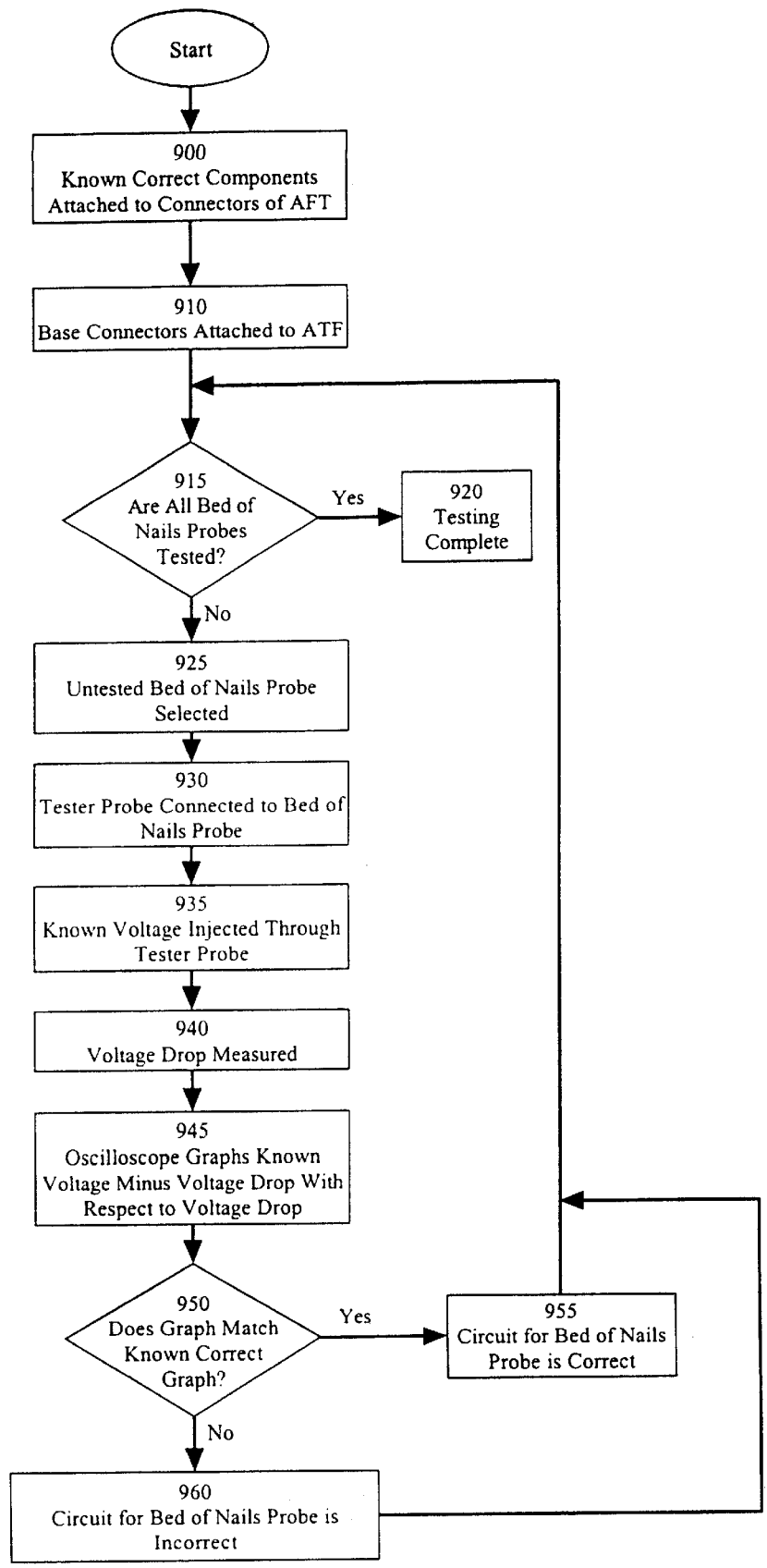
Figure 9: Testing AFT

METHOD AND APPARATUS FOR CHARACTERIZATION OF ELECTRONIC CIRCUITRY

BACKGROUND OF THE INVENTION

1. Field of the Invention

The present invention relates to circuit board testing equipment and more specifically to a method and apparatus for testing integrity of electronic circuits.

2. Background Art

Electronic systems rely on circuitry to function properly. Thus, it is desirable to test the circuitry for correctness. Some prior art testing methods require multiple steps to test connectivity and correctness of circuitry. Such testing methods are sometimes inefficient. This problem can be better understood by a review of the circuit testing process.

Advanced Functional Testers

Computer systems are one class of electronic system. A computer system typically utilizes a core circuit board, termed a "motherboard," to couple all components of the computer system. A computer system operates properly when its motherboard is functioning as designed. Thus, it is desirable to test motherboards for correct functionality before their use.

Testing the motherboard of a computer system is typically achieved using an Advanced Functional Tester (AFT). An AFT tests a computer system motherboard by simulating the load of functionally known components of a computer system (e.g., processor or memory) on the motherboard. Concurrently, an AFT monitors the performance of the motherboard to determine whether it is functioning as designed. However, to insure accurate testing of motherboards, the AFT must be tested for correctness.

FIG. 1 illustrates one embodiment of an AFT. The embodiment is divided into two sections: a base and a fixture. The base section contains the base (100) and one or more connectors termed "base connectors" (110). These connectors attach to the fixture section (130) through the base connector pins (120). During testing of a motherboard, the base performs the task of conducting the test operations, supplying power to the motherboard and monitoring the motherboard's performance.

During testing of a motherboard, the fixture simulates the components of the computer system in which the motherboard is designed to operate. Thus, the fixture is fitted with known, working computer components (e.g., processor or memory) (140) used for load simulation, one or more connectors termed "component connectors" (150) used to couple the computer components to the motherboard through network circuits (160) and probes termed "bed of nails probes" (170).

During testing, a motherboard receives power from the base after contacting the bed of nails probes. These probes couple the contacted points of the motherboard to the circuit networks, and the circuit networks are coupled to the component connectors. Likewise, the connectors are coupled to the computer components. Thus electrical current and signal information is conducted between the computer components and the motherboard.

It is important that the connections from the bed of nails probes, the circuit networks and the component connectors function as designed for the fixture to correctly simulate load during testing of a motherboard. Thus, the connectivity between the bed of nails probes and the component connectors are tested as part of testing the AFT.

During testing of a motherboard, the base connectors must function as designed for the base to properly perform its tasks of conducting the test operations, supplying power to the motherboard and monitoring the performance of the motherboard. Thus, the base connectors are tested as part of testing the AFT.

FIG. 2 illustrates the steps involved in a prior art method of testing an AFT. At step 200, a shorting board test is performed to test connectivity from the bed of nails probes to the component connectors. At step 210, a connector pin test is performed to test the base connectors. At step 220, a Load Test is performed to test the AFT overall functionality.

Shorting Board Test

A shorting board is a printed circuit board which is entirely conductive on both sides. Consequently, when attached to a connector, the shorting board allows current to flow between all the pins of that connector. Additionally, current flows to all bed of nails probes that are joined to that connector by the circuit networks.

FIG. 3 illustrates a shorting board test sequence of events. At step 300, a shorting board is attached to a component connector. At step 310, current is supplied from the shorting board. At step 320, current flows to the pins of the connector which are attached to the shorting board. At step 330, current flows to the bed of nails probes that contact the component connector pins through the circuit networks. At step 340, an untested bed of nails probe is selected.

At step 350, it is determined whether current reaches the selected probe. If current reaches the probe, at step 360, the circuit has connectivity and the process continues at step 380. If current does not reach the probe, at step 370, the circuit lacks connectivity and the process continues at step 380. At step 380, it is determined whether any untested probes remain. If an untested probe remains, the process repeats at step 340. If all probes are tested, at step 390, shorting board testing is complete.

The shorting board test is performed to determine whether connectivity is present from each bed of nails probe to its respective component connector pin. However, the shorting board test is insufficient in testing that every pin of a connector functions correctly since all connector pins are shorted to each other.

Connector Pin Test

FIG. 4 illustrates one embodiment of a connector pin test. The connector pin test is performed to determine whether each of the base connector pins (420) has continuity to the base. During the test, the base (400) supplies current to the base connectors (410). A DMM (430) is used to detect whether this current reaches each pin of the base connectors. One probe (440) of the DMM is connected to the common (ground) pin (460), and the other probe (450) is connected to the individual pin being tested (470). If the DMM detects a flow of current, the probing pin has continuity to the base. If no flow of current is detected, the probing pin does not have continuity to the base.

Load Test

The load test is performed to ensure the AFT is functioning properly when testing a known working motherboard. FIG. 5 illustrates the load test sequence of events. At step 500, functionally known computer components are attached to the fixture component connectors. At step 510, a motherboard, which is also known to work properly, is attached to the bed of nails probes. At step 520, the motherboard is made to contact the bed of nails probes. At step 530, power is supplied to the motherboard from the base. At step 540, the AFT tests the motherboard. At step 550, it is determined whether the AFT test results show the motherboard works correctly. If the AFT tests results show the motherboard works correctly, at step 560, the AFT functions correctly. If the AFT test results show the motherboard does not work correctly, at step 570, the AFT does not function correctly.

SUMMARY OF THE INVENTION

The present invention is a method and apparatus for characterization of electronic circuitry. Electronic systems rely on correct circuitry to function properly. Thus, a testing process is utilized to ensure correctness of circuitry. Some testing methods require multiple steps to test connectivity and correctness of circuitry. These methods are inefficient in some applications. The present invention improves efficiency of the testing process of some electronic systems.

One embodiment of the present invention injects a known current into a circuit at a test point by providing a known voltage across a known resistance. The voltage at the test point is measured and the circuit is characterized by a plot of the known voltage minus the measured voltage with respect to the measured voltage.

One embodiment is used to improve efficiency in testing advanced functional testers. Since a circuit is characterized by the embodiment contacting one test point, continuity and integrity from each connector pin are tested simultaneously. Thus, the need for a shorting board test is eliminated. Other embodiments are used to test other electrical systems.

BRIEF DESCRIPTION OF THE DRAWINGS

These and other features, aspects and advantages of the present invention will become better understood with regard to the following description, appended claims and accompanying drawings where:

FIG. 1 is a block diagram of an advanced functional tester.

FIG. 2 is a flow diagram of a prior art method for testing advanced functional testers.

FIG. 3 is a flow diagram of the process used for a shorting board test.

FIG. 4 is a block diagram of a connector pin test for use in a prior art method for testing advanced functional testers.

FIG. 5 is a flow diagram of the process used for a load test.

FIG. 6 is a block diagram of one embodiment of the present invention.

FIG. 7 is a flow diagram of the operation of the embodiment of FIG. 6.

FIG. 8 is a flow diagram of circuit characterization in accordance with one embodiment of the present invention.

FIG. 9 is a flow diagram of the process for testing an AFT in accordance with one embodiment of the present invention.

DETAILED DESCRIPTION OF THE INVENTION

The invention is a method and apparatus for characterization of electronic circuitry. En the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

Characterization Tool

FIG. 6 illustrates one embodiment of the present invention. The characterization tool (600) has a test voltage input (605). The test voltage input, resistor 1 (610) and resistor 2 (615) are coupled together. Resistor 1, test probe 1 (620), resistor 3 (625) and output 1 (630) are coupled together. Resistor 2, resistor 4 (635) and the positive input of the voltage subtracter (640) are coupled together. Resistor 3, the negative input of the voltage subtractor and resistor 5 (645) are coupled together. Test probe 2 (650) couples to the common voltage (ground) (655). Resistor 4 couples to the common voltage (ground) (660). Resistor 5, the output of the voltage subtractor and output 2 (665) are coupled together.

FIG. 7 illustrates the operation of the embodiment of FIG. 6. At step 700, a known voltage, Vs, is supplied to the test voltage input. At step 710, test probe 1 is connected to a circuit. At step 720, current flows through resistor 1, test probe 1 and the circuit to the common voltage. At step 730, the voltage, Vx, at the test probe is sent to output 1 and the negative input of the voltage subtractor. At step 740, Vs is sent to the positive input of the voltage subtractor. At step 750, the voltage subtractor produces the voltage Vs−Vx. At step 760, the voltage Vs−Vx is sent to output 2.

Resistance of Circuit

Ohm's law, a fundamental law of electrical circuitry, dictates the operation of the embodiment of FIG. 6. Ohm's law defines the electrical resistance, R, of a circuit, and states that the value of R is equal to the quotient V/I, wherein V is the voltage across the circuit and I is the current flowing through the circuit.

In FIG. 6, by applying Ohm's law to the circuit between test probe 1 and test probe 2, the resistance, Rx, of the circuit is equal to the voltage, Vx, across that circuit divided by the current; Ix, flowing through it. The relationship is given by the following equation:

$$Rx=Vx/Ix \qquad \text{(Equation 1)}$$

The current flowing through resistor 1, Is, is calculated using the known resistance, Rs, of resistor 1. Is is given by the following equation:

$$Is=(Vs-Vx)/Rs \qquad \text{(Equation 2)}$$

Is is divided into two currents Ix and Iy, where Is is equal to the sum of Ix and Iy. Ix is the current flowing to test probe 1. Similarly, Iy is the current flowing to resistor 3 and output 1. In the embodiment of FIG. 6, current Iy is purposely designed to be negligible. Thus, Ix is equal to Is.

Thus, by substituting Ix for Is in Equation 2, current Ix is calculated as shown in the following equation:

$$Ix=(Vs-Vx)/Rs \qquad \text{(Equation 3)}$$

Finally, by substituting (Vs−Vx)/Rs for Ix in Equation 1, the circuit resistance, Rx, is determined as shown in the following equation:

$$Rx=(Vx*Rs)/(Vs-Vx) \qquad \text{(Equation 4)}$$

Equation 4 demonstrates that a plot of (Vs−Vx) with respect to (Vx*Rs) is sufficient for characterizing the resistance Rx. Since Rs remains constant, characterizing Rx can be achieved by plotting (Vs−Vx) with respect to Vx. Thus, a plot of Vs−Vx with respect to Vx is used to characterize a circuit by characterizing its resistance.

Characterizing a Circuit

FIG. 8 illustrates the process of characterizing a circuit in accordance with one embodiment of the present invention. At step 800, a known voltage is injected into the circuit being tested using the testing probe. At step 810, the voltage drop across the circuit connecting the point the testing probe touches and the common voltage is measured. At step 820, a graph of the known voltage minus the voltage drop with respect to the voltage drop is plotted using an oscilloscope. At step 830, the graph is used to characterize the circuit.

AFT Testing

FIG. 9 illustrates the process for testing an AFT in accordance with one embodiment of the present invention. At step 900, all known correct components are attached to the connectors of the AFT Fixture. At step 910, all base connectors are attached to the fixture. At step 915, it is determined whether all bed of nails probes have been tested. If all bed of nails probes have been tested, at step 920, testing is complete. If not all bed of nails probes have been tested, at step 925, an untested bed of nails probe is selected.

At 930, the tester probe is connected to the bed of nails probe. At step 935, a known voltage is injected through the tester probe. At step 940, the voltage drop across the circuit connecting the bed of nails probe and the common voltage is measured. At step 945, a graph of the known voltage minus the voltage drop with respect to the voltage drop is plotted using an oscilloscope.

At step 950, it is determined whether the graph from step 945 matches a known correct graph for this bed of nails probe. If the graph from step 945 matches a known correct graph for this bed of nails probe, at step 955, the circuit for this bed of nails probe is correct and the process repeats at step 915. If the graph from step 945 does not match a known correct graph for this bed of nails probe, at step 960, the circuit for this bed of nails probe is incorrect and the process repeats at 915.

Thus, a method and apparatus for characterization of electronic circuitry is described in conjunction with one or more specific embodiments. The invention is defined by the following claims and their full scope and equivalents.

What is claimed is:

1. A method for circuit characterization comprising:

injecting a plurality of known voltages into a circuit at a first test point;

sending said plurality of known voltages to a positive input of a voltage subtractor;

measuring a plurality of measured voltages across said first test point and a second test point having a common voltage;

sending said plurality of measured voltages to a first output;

sending said plurality of measured voltages to a negative input of said voltage subtractor;

obtaining a plurality of differences between said plurality of known voltages and said plurality of measured voltages at said voltage subtractor;

sending said plurality of differences to a second output;

coupling said first and second outputs to an oscilloscope;

plotting a graph of said plurality differences with respect to said plurality of measured voltages on said oscilloscope; and determining a characteristic of said circuit based on said graph.

2. The method of claim 1, wherein said determining said characteristic of said circuit based on said graph comprises:

matching said graph with a known correct graph for said circuit; and determining correctness of said circuit from matching said graphs.

3. The method of claim 2, wherein said correctness of said circuit is determined qualitatively.

4. The method of claim 2, wherein said correctness of said circuit is determined without using a computer.

5. The method of claim 2, wherein said correctness of said circuit is determined without using an analog-to-digital converter.

6. The method of claim 2, wherein said graph is generated by analog means and wherein said correctness of said circuit is determined qualitatively.

7. The method of claim 2, wherein said correctness of said circuit is determined without using a mulitiplexer.

8. The method of claim 2, wherein said correctness of said circuit is determined without using an absolute value converter.

9. The method of claim 2, wherein said correctness of said circuit is determined qualitatively without using a limits generator.

10. The method of claim 2, wherein said correctness of said circuit is determined qualitatively using only a single comparison.

11. The method of claim 2, wherein said correctness of said circuit is determined without powering on said circuit.

12. The method of claim 1, wherein said graph is plotted without measuring any current.

13. The method of claim 1, wherein said graph is plotted by using only said plurality of known voltages and said plurality of measured voltages.

14. The method of claim 1, wherein only voltages are measured across said first and second test points.

15. The method of claim 1, wherein said plurality of measured voltages are generated from said plurality of known voltages.

16. The method of claim 1, wherein said circuit being characterized is an Advanced Functional Tester (AFT) and wherein said AFT is coupled to a plurality of known correct components.

17. A circuit characterization tool comprising:

a test voltage input source for providing a plurality of known voltages;

a test probe configured to inject said plurality of known voltages from said test voltage input source into a circuit at a first test point;

a measurer configured to measure a plurality of measured voltages across said first test point and a second test point having a common voltage;

a first output configured to receive said plurality of measured voltages at said test point;

a voltage subtractor having a positive input, a negative input, and a second output; and an oscilloscope coupled with said first and second outputs;

wherein said positive input is configured to receive said plurality of known voltages;

wherein said negative input is configured to receive said plurality of measured voltages;

wherein said voltage subtractor is configured to obtain a plurality of differences between said plurality of known voltages and said plurality of measured voltages;

wherein said second output is configured to obtain said plurality of differences;

wherein said oscilloscope displays a graph of said plurality differences with respect to said plurality of measured voltages; and wherein a viewer of said oscilloscope can qualitatively determine a characteristic of said circuit based on said graph.

18. The circuit characterization tool of claim 17, wherein said circuit is an Advanced Functional Tester (AFT) having a plurality of connectors and wherein known correct components are attached to said plurality of connectors.

19. The circuit characterization tool of claim 18, wherein said AFT is characterized when said AFT is not turned on.

20. The circuit characterization tool of claim 17, wherein said circuit is characterized without any comparison.

* * * * *